Feb. 4, 1936.  E. LJUNGSTRÖM ET AL  2,029,329
DEVICE FOR OPENING CANS
Filed July 18, 1934  3 Sheets-Sheet 1
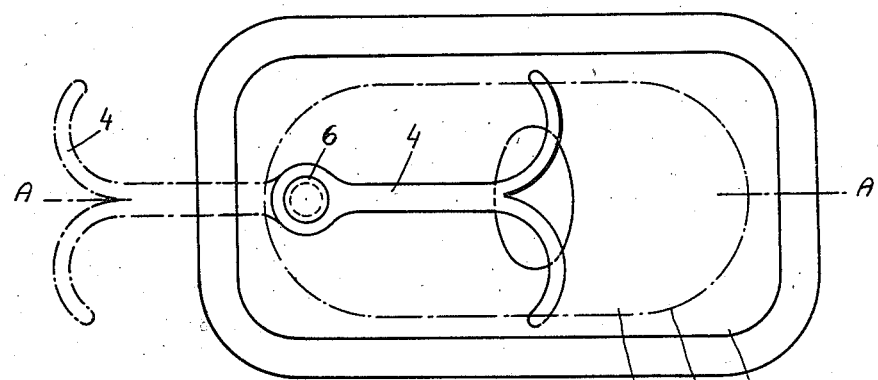
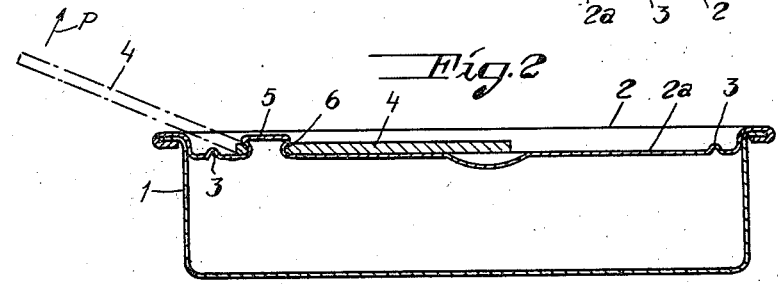
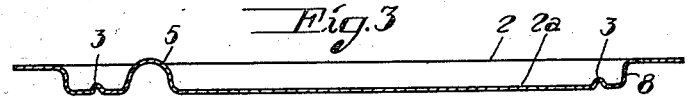
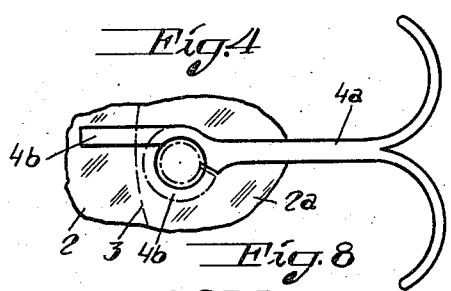
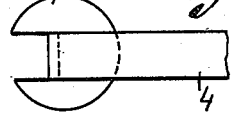
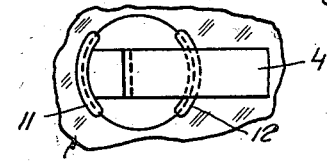
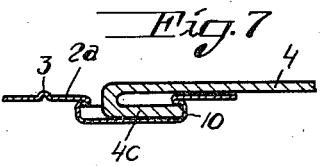
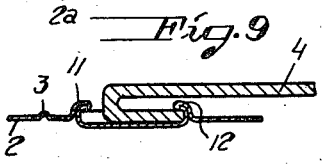

Feb. 4, 1936.  E. LJUNGSTRÖM ET AL  2,029,329
DEVICE FOR OPENING CANS
Filed July 18, 1934  3 Sheets-Sheet 2
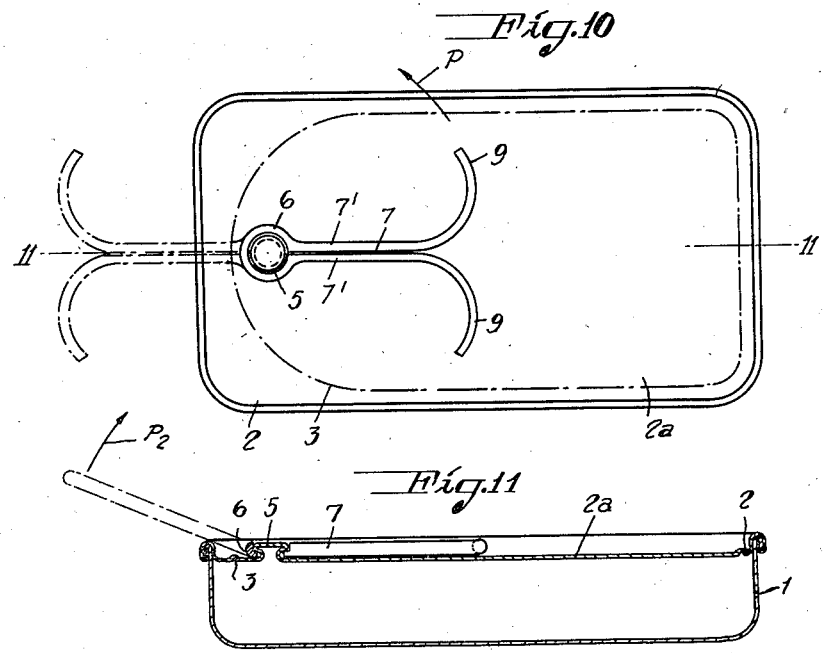
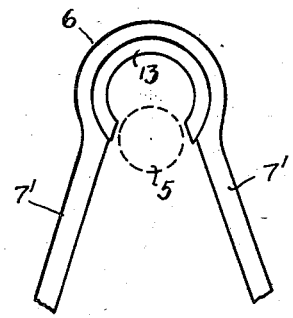
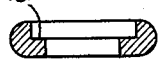
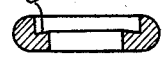
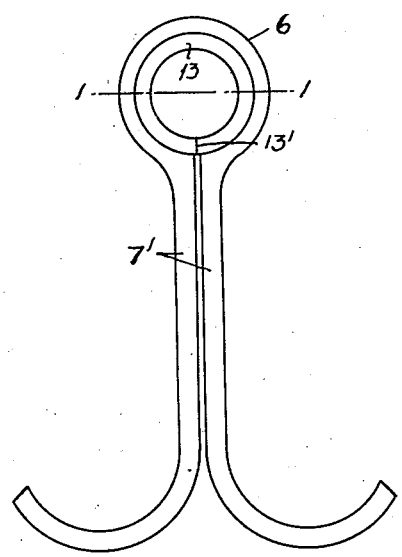

Feb. 4, 1936. E. LJUNGSTRÖM ET AL 2,029,329
DEVICE FOR OPENING CANS
Filed July 18, 1934 3 Sheets-Sheet 3
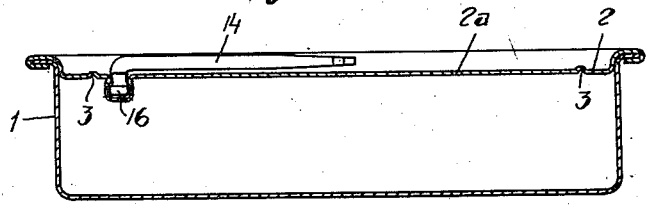
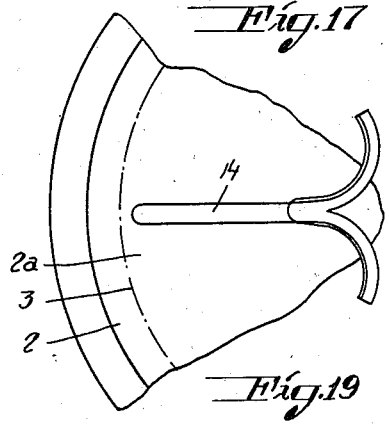
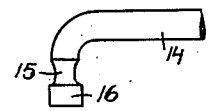
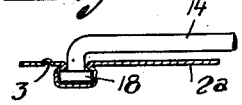

Patented Feb. 4, 1936

2,029,329

UNITED STATES PATENT OFFICE 2,029,329

DEVICE FOR OPENING CANS

Erik Ljungström, Lidingö-Brevik, and Olof August Olsson, Stockholm, Sweden, assignors to Aktiebolaget Transitoria, Stockholm, Sweden, a Swedish corporation Application July 18, 1934, Serial No. 735,844
In Sweden October 21, 1932

14 Claims. (Cl. 220—48)

The present invention relates to devices for opening cans and has for its general object the provision of improved means for attaching to the can or container a tearing member which is manipulatable to remove by tearing a portion of the wall of the container that is defined wholly or in part by a tearing line or score in the material of which the container is made.

In accordance with the invention, attaching means is formed from a part of that portion of the wall material that is to be torn away, such attaching means being adapted to cooperate with the attached end of a tearing member to effect initial breaking or rupture of the tearing line. The attaching means is, in accordance with the invention, formed integrally with the wall material, thus avoiding the necessity for providing any sealing means between the wall of the container and the attached end of the tearing member.

The attaching means may be, within the scope of the invention, formed of wall material pressed either inwardly or outwardly of the surface of the container and is preferably formed so as to provide a pivotal connection between the wall material of the container and the tearing member, which connection permits the tearing member to be turned to an operating position with the free end of the member extending past an edge of the container so as to be readily accessible for purposes of manipulation. For a better understanding of the detailed nature of the invention and the manner in which it is advantageously carried into effect, reference may be had to the ensuing portion of this specification in which a number of examples of suitable structure are described.

In the accompanying drawings forming a part of the specification:

Fig. 1 shows a preserve can with attaching means for the opening member in plan view, Fig. 2 is a section on line A—A in Fig. 1.

Fig. 3 is a longitudinal section of the cover of the preserve can prior to the finishing thereof, Fig. 4 illustrates a further mode of attachment, Figs. 5–7 show an embodiment, in which the cover wall is pressed inwardly.

Figs. 8 and 9 show a similar embodiment with a modified attachment of the grip,

Fig. 10 shows an embodiment, in which the grip is formed from wire material,

Fig. 11 is a section on line II—II in Fig. 10,

Fig. 12 shows the ready-bent grip in plan view to a larger scale,

Figs. 13 and 14 are sections on line I—I in Fig. 12, in different embodiments,

Fig. 15 shows the placing of the grip on the attaching means,

Fig. 16 shows a further embodiment, in which the grip consists of a metal wire having a reinforced end portion, Fig. 17 is a partial view of the embodiment according to Fig. 16, Fig. 18 shows the part of attachment of the grip to a larger scale and Figs. 19–22 represent modified forms of construction of the end portion of the grip.

In Figs. 1 and 2, 1 designates a preserve can having a cover 2 folded thereon, a packing of rubber or the like being inserted into the fold. Provided in the cover in any suitable manner is a weakened tearing line or score 3 limiting that part 2a of the cover which is to be removed when the can is opened. The grip 4 is provided at its one end with an enlarged portion 6 having an opening therein, and is bifurcated at its other end. In the example illustrated in Figs. 1–3, the attachment of the grip to the can wall is effected in such manner that a knob 5 is pressed out of the material of the cover in the part 2a to be torn off, in the proximity of the tearing line 3. The diameter of this knob situated in the proximity of the plane of the cover is equal to or somewhat smaller than the diameter of the opening of the grip 4. The grip is placed over the pressed-out part, which is then pressed over the grip. It is not absolutely necessary that the knob have a circular shape, although this is to be preferred from the point of view of manufacture. The pressed-out part is to be given such a shape, however, that it will be symmetrical with respect to more than two planes.

The knob 5 may be provided simultaneously with other pressing operations in the cover, for instance simultaneously with the bending-up of the edge portion 8, see Fig. 3. The tearing line 3 may then also be pressed into the material at the same time.

The additional work required for the attachment of the grip is thus limited to the placing of the grip over the knob and to the upsetting of the latter over the grip. This also will ensure that no leakage occurs at the place of attachment. However, if in certain cases cracking is to be feared when the knob is pressed out of inferior material, it is possible to employ packing material, such material being firmly squeezed between the knob and the grip when the former is pressed over the latter.

In the embodiment described, the grip is turned into the position shown by chain-dotted lines in Figs. 1 and 2 when the can is to be opened. In this position the portion of the material in the proximity of the tearing line 3 is powerfully strained by the raising of the grip over the folded edge of the can, whereby rupturing of the tearing line is effected or facilitated in this place. Upon this initial rupturing, the part to be torn off can be easily removed by pulling the grip, the latter having prior to this been turned in the direction of the arrow $p$. As in this case the grip is to be turned as far as to the position shown by chain-dotted lines, the joint must not be too rigid, in order not to render said turning too difficult. If on the other hand opening of the can is to be effected without turning the grip about the place of attachment, the riveting may be made more rigid. The attachment of the tearing or opening member as described is naturally not limited to the construction of the can shown in Figs. 1–3, but may also be used in such cans wherein the opening member is not raised over the folded edge and wherein on the turning of the opening member beyond the folded edge there will be no straining of the tearing line.

The portion 6 of the grip may also be made by a suitable pressing operation to the shape shown in Fig. 2, without the grip being secured at the same time by upsetting. The grip may then be secured to the part of attachment of the can wall afterwards, as shown in Fig. 4. As will be seen from this figure, the grip 4a proper has no opening, but is provided with a finger-like extension 4b which in the placing of the grip is laid against the cylindrical portion of the knob and then bent by means of a suitable tool into the position shown by chain-dotted lines.

The knob pressed out of the material of the can may also be formed as an external guide for the part of the grip to be secured. An example of such an embodiment is illustrated in Figs. 5–7. The part 4c of the grip 4 is inserted into a cylindrical depression 10 in the material of the part to be torn off, and said part 4c may be of the form shown in Fig. 6. The upper portion of the material of the cylindrical depression 10 is then bent over the part 4c in the manner shown in Fig. 7.

Figs. 8 and 9 show an attachment in plan view and in section, wherein the grip is formed in the same manner as in Fig. 6, whereas here the material of the can wall is only partly bent over the grip, that is to say at the places 11 and 12.

The embodiments of the invention to be described in the following show how the grip adapted as an opening member may be produced in a simple manner from a metal wire which either grips the pressed-out portion of the can wall or is gripped by said part.

In Figs. 10 and 11, the opening member 7, which consists of a metal wire, preferably of iron or steel, is secured to the pressed-out part 5 of the can wall. The wire has a bent portion 6, which embraces the part 5; the free ends 9 thereof are bent to form a double-hooked grip.

In the example of embodiment shown, the opening member 7 is rotatably arranged at its attached end. The opening of the can is again effected in such manner that the grip is turned from the position shown in full lines, in the direction of the arrow $p'$, to the position shown by chain-dotted lines. From this position the grip is then turned upwardly in the direction of the arrow $p^2$, Fig. 11, rupture of the material of the cover being thus effected at the tearing line 3, whereupon the part 2a of the cover may be removed by pulling the grip.

The opening member may be applied in such manner that the circularly bent portion 6 is thrust over the part 5, which is only afterwards pressed over the opening member. This pressing operation, however, may also take place prior to applying the opening member. A preliminary bend is then preferably imparted to the wire, whereby the basic form of the circularly bent part is obtained, so great an opening being then left, however, between the shanks 7' forming an angle between them that the wire may be brought from the side onto the stem of the part 5, Fig. 15. The wire is then bent to the final shape by means of a suitable tool so as to completely embrace the neck portion of this part.

The operation described is advantageous for the reason that the opening member need not then be applied until the cover has been folded upon the ready-packed can and the latter has been washed. When the grip is already applied to the can when the latter is washed, the washing procedure is made difficult.

The opening member is preferably made from a wire of round cross section. Although not absolutely necessary it is nevertheless of advantage to form a flange portion, preferably situated on the inside, in the circularly bent portion by pressing the wire material, which flange portion forms a bearing for the head portion of the attaching means. Said head portion need not then project over the wire, but may be countersunk in the same, as will be seen from the section shown in Fig. 11. Fig. 12 illustrates in plan view a ready-bent opening member provided with such a flange 13. In Figs. 13 and 14, which represent sections on line I—I in Fig. 12, two different constructions of the flange 13 are illustrated. As will be seen from Fig. 12, the flange 13 extends round the whole opening in the portion 6, so that the end surfaces thereof are caused to abut against each other, as at 13', since the flange is caused to flow out toward the sides at the end surfaces when the wire is compressed. Where no flange is provided, it will be found difficult through the resiliency of the wire material to obtain a complete circular bearing surface for the head portion of the attaching means. It is of importance that the head abuts at the joint of the shanks, that is to say at 13' in Fig. 12, as in the rupturing of the can wall the opening power will be transmitted to the head portion at the said place and since the shanks might otherwise be easily pressed apart.

It will be readily seen that the manufacture of the described opening member may be effected simply and inexpensively with the aid of suitable tools.

In the embodiments shown in Figs. 16–22, the material of the can wall is pressed inwardly of the can to provide a recess. The opening member is again made from a wire 14 which is bent about at right angles at the one end thereof. As shown to a larger scale in Fig. 18, the bent-down end portion has a head 16, which in the present case was formed by providing a restriction 15 in the material of the wire. The head 16 is limited upwardly by an edge, against which the sheet metal material forming the wall of the recess, so that the head will be firmly supported. The other end of the opening member 14 is formed into a grip.

Fig. 19 shows an embodiment of the opening member 14 wherein the end portion of the wire is upset and forms an enlargement 17 shaped as the frustrum of a cone, said enlargement being inserted into the knob, whereupon the sheet metal material is pressed about the enlargement.

The opening member illustrated in Fig. 20 is provided with a cylindrical head 18 of a greater diameter than that of the wire. The mode of attachment to the can wall is readily to be seen from the drawings. Here, too, the upper edge of the head abuts against the sheet metal material.

Finally, Figs. 21 and 22 illustrate a mode of attaching the opening member to the can, wherein the end of the wire is bent substantially circularly, the bent portion 19 being inserted into the recess in the can wall, whereupon the wall of the latter is again pressed against the part 19.

The invention is not limited to the embodiments illustrated, but may be modified in various respects.

What we claim is:—

1. A container having wall material defined at least in part by a tearing line adapted to be ruptured and torn to effect opening of the container by displacement of said wall material, a tearing member and attaching means for said tearing member located adjacent to a place of rupture in said line, said attaching means being formed from that portion of said wall material that is displaceable by virtue of said tearing line and providing wall structure engaging the attached end portion of said tearing member to retain the tearing member in attached relation when it is in an operating position with a portion of the tearing member overlying said place of rupture and with the free end of the tearing member subjected to pull in a direction away from the container, said attaching means and the attached portion of said tearing member cooperating upon such pull of the free end of the tearing member to effect initial breaking of the tearing line at said place of rupture.

2. A container having wall material defined at least in part by a tearing line adapted to be ruptured and torn to effect opening of the container by displacement of said wall material, a tearing member and attaching means located adjacent to a place of rupture in said line for pivotal attachment of one end portion of said tearing member, said attaching means being pressed from that portion of said wall material that is displaceable by virtue of said tearing line and providing wall structure engaging the attached end portion of said tearing member to retain the tearing member in attached relation when it is in an operating position with a portion of the tearing member adjacent to said place of rupture and with the free end of the tearing member subjected to an opening force in a direction away from the container, said attaching means and the attached portion of said tearing member cooperating upon the application of such force to the free end of the tearing member to effect initial breaking of the tearing line at said place of rupture.

3. A container having wall material defined at least in part by a tearing line adapted to be ruptured and torn to effect opening of the container by displacement of said wall material, a tearing member and attaching means for said tearing member located adjacent to a place of rupture in said line, said attaching means being formed from that portion of said wall material that is displaceable by virtue of said tearing line and providing wall structure pivotally engaging the attached end portion of said tearing member to permanently retain the tearing member in attached relation and to permit movement of the tearing member to an operative position with a portion of the tearing member overlying said place of rupture and with the free end of the tearing member in a position to be pulled away from the container, said attaching means and the attached portion of the tearing member cooperating upon such pull of the free end of the tearing member to effect initial breaking of the tearing line at said place of rupture.

4. A container having wall material defined at least in part by a tearing line adapted to be ruptured and torn to effect opening of the container by displacement of said wall material, a tearing member and attaching means located adjacent to a place of rupture in said line for said tearing member, said attaching means consisting of a recess having walls formed of that portion of said wall material that is displaceable by virtue of said tearing line and said tearing member having an end portion engaging the walls of said means to retain the tearing member in attached relation when it is in an operating position with a portion of the tearing member overlying said place of rupture and with the free end of the tearing member subjected to pull in a direction away from the container, said attaching means and the attached portion of said tearing member cooperating upon such pull of the free end of the tearing member to effect initial breaking of the tearing line at said place of rupture.

5. A container having wall material defined at least in part by a tearing line adapted to be ruptured and torn to effect opening of the container by displacement of said wall material, a portion of said wall material adjacent to said tearing line and displaceable by virtue of the tearing line being pressed inwardly of the container to provide a recess, and a tearing member having an end portion situated in said recess, said tearing member having an operating position with a portion of the tearing member adjacent to a place of rupture and with the free end of the tearing member subjected to an opening force in a direction away from the container, the walls of said recess and said end portion of the tearing member cooperating upon the application of such force to the free end of the tearing member to effect initial breaking of the tearing line at said place of rupture.

6. A container having wall material defined at least in part by a tearing line adapted to be ruptured and torn to effect opening of the container by displacement of said wall material, a portion of said wall material adjacent to said tearing line and displaceable by virtue of the tearing line being pressed inwardly of the container to provide a recess, and a tearing member having an end portion situated in said recess, the walls of the recess and said end portion being shaped to permit pivotal movement of said tearing member to an operative position with a portion of the tearing member overlying said place of rupture and with the free end of the tearing member in a position to be pulled away from said container, the walls of said recess and said end portion of the tearing member cooperating upon such pull on the free end of the tearing member to effect breaking of the tearing line at said place of rupture.

7. A container having wall material defined at least in part by a tearing line adapted to be ruptured and torn to effect opening of the container by displacement of said wall material, a portion of said wall material adjacent to said tearing line and displaceable by virtue of the tearing line being pressed inwardly of the container to provide a reentrant recess of generally circular cross-section, and a tearing member having a headed end portion secured for pivotal movement in said recess, said tearing member being movable to an operative position with a portion of the tearing member overlying a place of rupture and with the free end of the tearing member in a position to be pulled away from the container, the walls of said recess and said end portion of the tearing member cooperating upon such pull on the free end of the tearing member to effect initial breaking of the tearing line at said place of rupture.

8. A container having wall material defined at least in part by a tearing line adapted to be ruptured and torn to effect opening of the container by displacement of said wall material, a portion of said wall material adjacent to said tearing line and displaceable by virtue of the tearing line being pressed inwardly of the container to provide a reentrant recess, and a tearing member having a bent end portion grooved to provide a head at the end of the member for engagement with portions of the walls of the recess when the tearing member is in operating position with a portion of the tearing member overlying a place of rupture and with the free end of the tearing member in a position to be pulled away from the container, the engaging parts cooperating upon such pull on the free end of the tearing member to effect breaking of the tearing line at said place of rupture.

9. A container having wall material defined at least in part by a tearing line adapted to be ruptured and torn to provide for opening of said container, a portion of said wall material adjacent to said tearing line and displaceable by virtue of the tearing line being pressed outwardly of the container to provide attaching means for one end portion of a tearing member, said attaching means having a head portion and a neck portion connecting the head portion with the body of said material, said neck portion being of smaller cross-sectional area than the head portion, and a tearing member having an end portion adapted to engage the neck portion of the attaching means with the tearing member in an operative position with a portion of the tearing member overlying a place of rupture in said tearing line and with the free end of the tearing member in a position to be pulled away from the container, the engaging parts of said tearing member and said attaching means cooperating upon such pull on the free end of the tearing member to effect breaking of the tearing line at said place of rupture.

10. A container having wall material defined at least in part by a tearing line adapted to be ruptured and torn to provide for opening of said container, a portion of said wall material adjacent to said tearing line and displaceable by virtue of the tearing line being pressed outwardly of the container to provide attaching means for one end portion of a tearing member, said attaching means having a head portion and a neck portion connecting the head portion with the body of said material, said neck portion being of smaller cross-sectional area than the head portion, and a wire-like tearing member having a flattened portion intermediate its ends bent around the neck portion of said attaching means to engage the neck portion under the head portion thereof, the end portions of the tearing member being formed to provide a grip, and the tearing member having an operative position with a portion of the tearing member overlying a place of rupture in said tearing line and with the free end of the tearing member in a position to be pulled away from the container, the engaging parts of said attaching means and said tearing member cooperating upon such pull to break the tearing line at said place of rupture.

11. A container having wall material defined at least in part by a tearing line adapted to be ruptured and torn to provide for opening of said container, a portion of said wall material adjacent to said tearing line and displaceable by virtue of the tearing line being pressed outwardly of the container to provide a headed projection of generally circular cross-section for pivotal attachment of a tearing member, and a tearing member having an end portion adapted to engage the walls of said projection under the head thereof when in operative position with an intermediate portion of the tearing member overlying a place of rupture in the tearing line and with the free end of the tearing member in a position to be pulled in a direction away from the container, the engaging portions of said projection and said tearing member cooperating upon such pull to break said tearing line at said place of rupture.

12. As a new article of manufacture, a sheet metal container having wall material defined at least in part by a tearing line adapted to be ruptured and torn to provide an opening for the container, a portion of said wall material closely adjacent to said tearing line and displaceable by virtue of the tearing line being pressed inwardly of the container to form a recess for the reception of one end portion of a lever-like tearing member adapted upon application of an opening force to the free end of the member to engage the walls of said recess to effect initial breaking of the tearing line.

13. As a new article of manufacture, a sheet metal container having wall material defined at least in part by a tearing line adapted to be ruptured and torn to provide an opening for the container, a portion of said wall material closely adjacent to said tearing line and displaceable by virtue of the tearing line being pressed inwardly of the container to form a reentrant recess of generally circular cross section for the reception of a headed end portion of a lever-like tearing member adapted upon application of an opening force to the free end of the member to engage the walls of said recess to effect initial breaking of the tearing line.

14. As a new article of manufacture, a sheet metal container having wall material defined at least in part by a tearing line adapted to be ruptured and torn to provide an opening for the container, a portion of said wall material closely adjacent to said tearing line and displaceable by virtue of the tearing line being pressed outwardly of the container to form a headed projection of generally circular cross section, said projection providing attaching means adapted to be engaged by one end portion of a leverlike tearing member for breaking said tearing line upon pull away from the container of the free end of the member.

ERIK LJUNGSTRÖM.
OLOF AUGUST OLSSON.